United States Patent [19]

Taniyama

[11] Patent Number: 5,388,713
[45] Date of Patent: Feb. 14, 1995

[54] STORAGE CONTAINER

[76] Inventor: Yoshihiko Taniyama, 9380 Old Southwick Pass, Alpharetta, Fulton County, Ga. 30202

[21] Appl. No.: 48,285

[22] Filed: Apr. 14, 1993

[51] Int. Cl.⁶ .............................................. B65D 85/30
[52] U.S. Cl. .................................. 220/4.22; 206/312; 206/308.1
[58] Field of Search ............... 206/309, 312, 313, 444; 220/4.22, 532, 533

[56] References Cited

U.S. PATENT DOCUMENTS

| | | | |
|---|---|---|---|
| 4,316,539 | 2/1982 | Torrington | 206/312 X |
| 4,535,888 | 8/1985 | Nusselder | 206/444 |
| 4,627,531 | 12/1986 | Clemens | 206/312 X |
| 4,655,345 | 4/1987 | Drake et al. | 206/309 |
| 4,702,369 | 10/1987 | Philosphe | 206/312 |
| 4,750,611 | 6/1988 | Morrone | 206/45.13 |
| 4,793,480 | 12/1988 | Gelardi et al. | 206/312 |
| 4,817,792 | 4/1989 | Seifert | 206/309 |
| 4,867,302 | 9/1989 | Takahashi | 206/45.13 |
| 4,875,743 | 10/1989 | Gelardi et al. | 312/13 |
| 4,899,875 | 2/1990 | Herr et al. | 206/313 |
| 4,928,818 | 5/1990 | Friess et al. | 206/309 |
| 4,932,522 | 6/1990 | Milovich | 206/309 |

*Primary Examiner*—Steven M. Pollard
*Attorney, Agent, or Firm*—Troutman Sanders; Joel S. Goldman; John A. Savio, III

[57] ABSTRACT

A storage container for hexahedron objects, such as mini-disk cartridges and promotional material. The container comprises two primary components, a base tray and a cover, where the base tray is constructed such that it may house two hexahedron objects. The base tray, which has two parallel side walls, is formed with a ledge extending inwardly from each of the side walls such that one object may be stored on top of the ledges and another object may be secured below the ledges. The cover is constructed with support extensions for supporting the cover and securing the object resting on the ledge when the container is in the closed position.

31 Claims, 4 Drawing Sheets

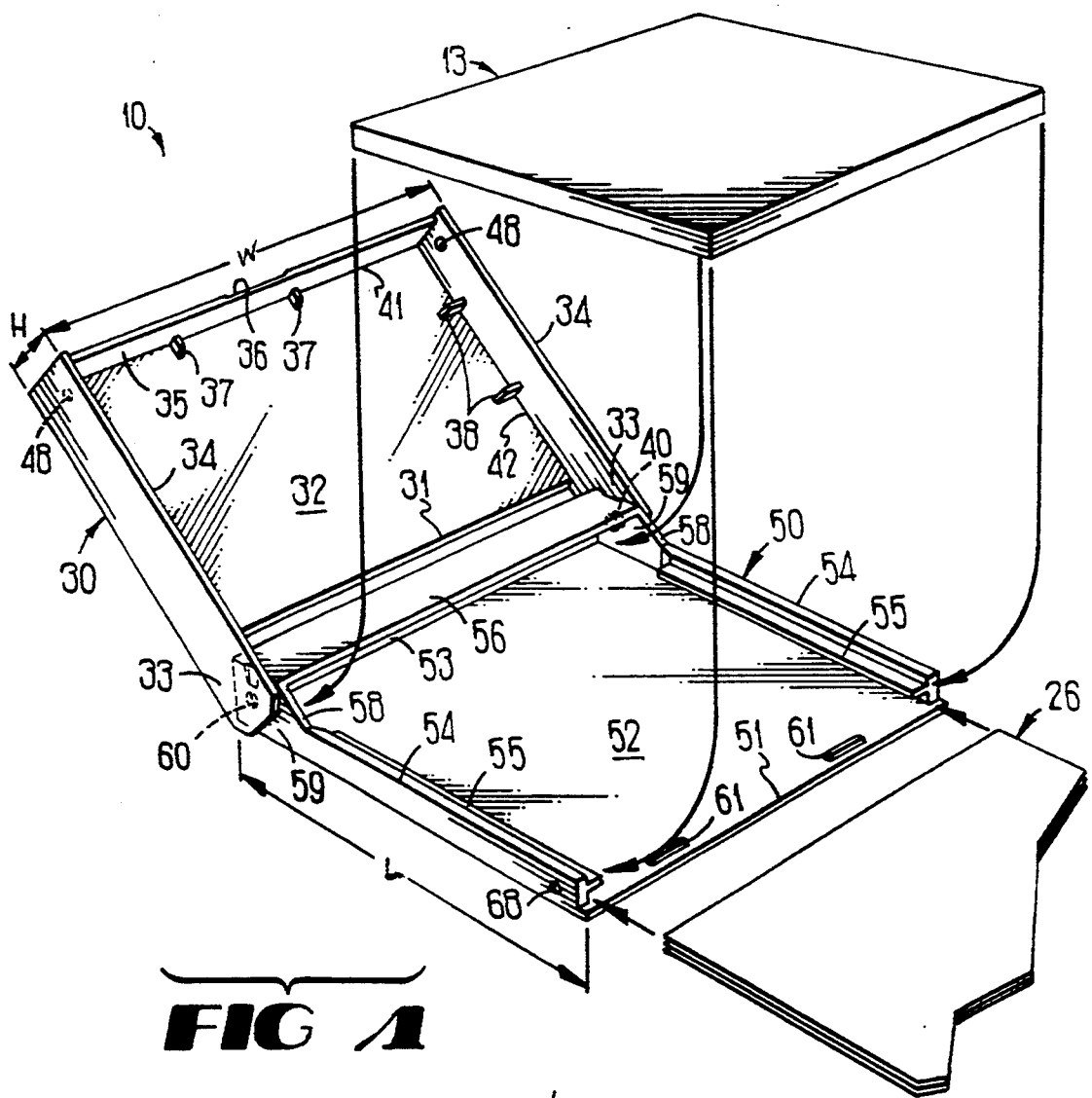
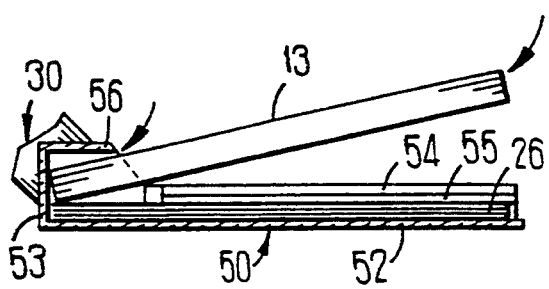
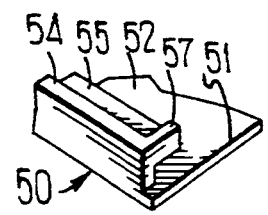
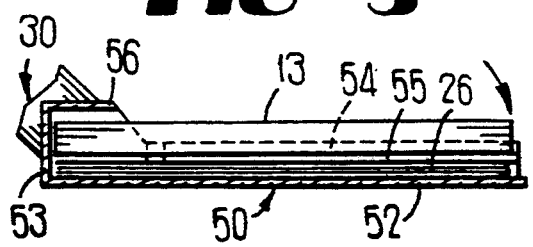
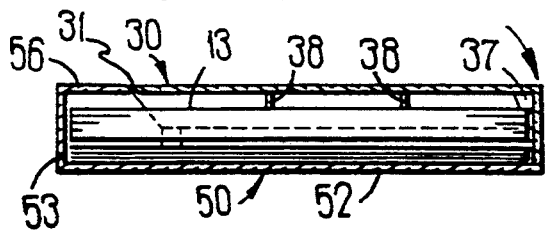

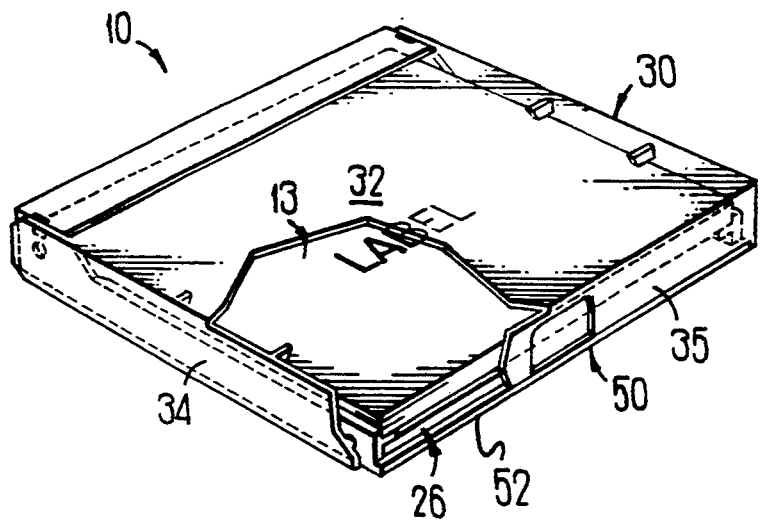
FIG 6
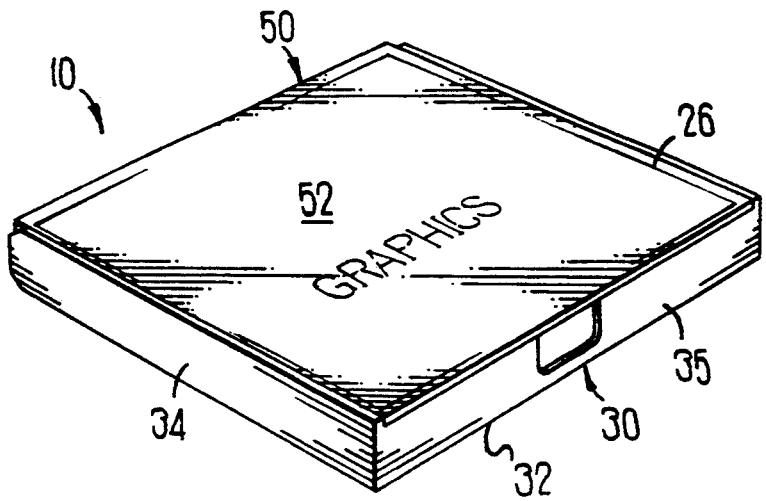
FIG 7
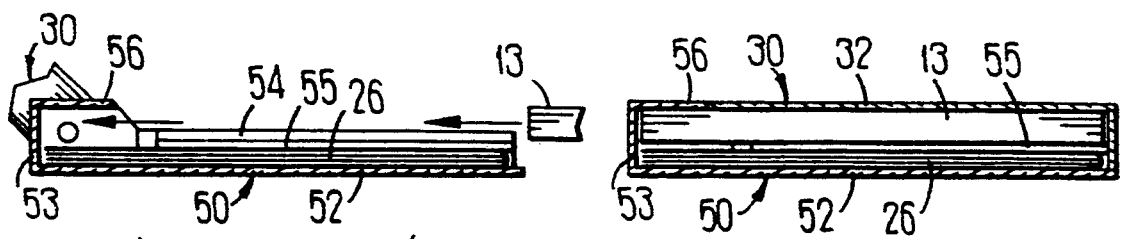
FIG 8     FIG 9

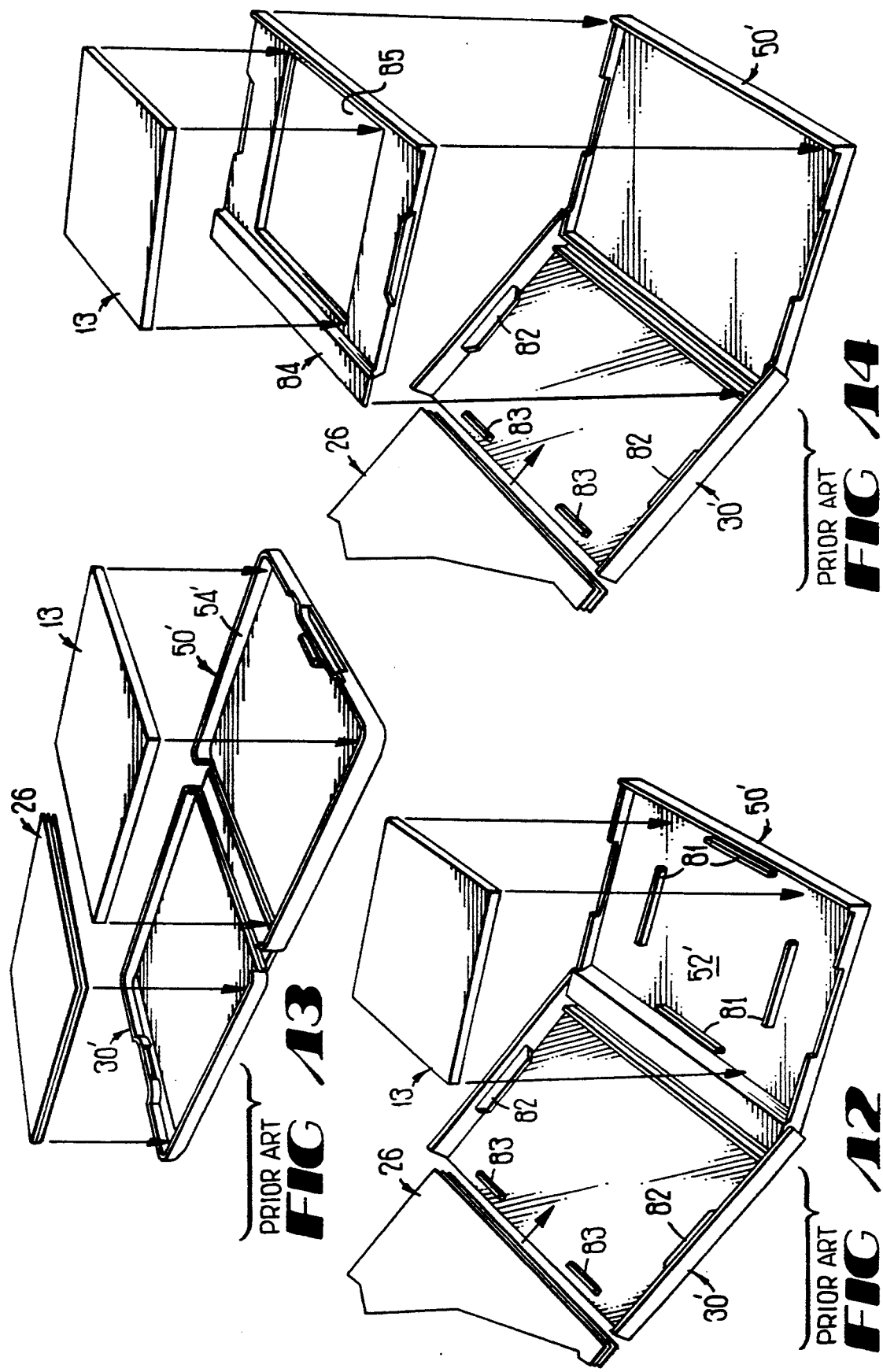

STORAGE CONTAINER

BACKGROUND OF THE INVENTION

1. Field of Invention

The present invention relates to a storage container for six sided objects known as hexahedrons. More specifically, this invention relates to a two component container for storing two hexadrons, such as mini-compact disk ("mini-CD") cartridges and/or promotional materials, in the bottom component known as a base tray.

2. Description of the Prior Art

As shown in FIGS. 12 through 14, conventional storage containers for hexadron objects, such as mini-disk cartridges 13 and the like, are often called jewel boxes. Typically, the jewel box is made of transparent plastic, such as polystyrene. Due to the use of transparent plastic for these containers, many such jewel boxes include two primary components: a base tray 50' and a cover 30'. These containers usually allow for the cartridge to be secured in the base tray, while promotional material 26, such as a booklet or a card, is inserted into the cover. The base tray and the cover, may be hingedly connected at their rear side edges to form a clam shell like enclosure.

In one such container, as shown in FIG. 12, the mini-disk cartridge may be secured within protruding rims 81 which extend upwardly from the bottom surface 52' of the base tray. The rims 81 typically surround a substantial portion of the cartridge and often make contact with its edges. Further, a booklet or card may be inserted underneath tabs 82 extending inwardly from the side walls of the cover, and small protrusions 83 in the front of the cover may be utilized to secure the promotional material. Since the container is usually transparent, the contents of the container may be viewed from the card or booklet through the cover and through the bottom of the base tray if the cartridge is inserted with its label side face down.

FIG. 13 shows another known container, in which the dimensions of the base tray and cover are slightly bigger, but substantially the same, as those of a mini-disk cartridge. Therefore, the cartridge may be secured by the surrounding walls of the base tray. For example, as shown in this figure, the side walls 54' are employed to secure the cartridge when it is inserted into the base tray. Moreover, a booklet or card with length and/or width dimensions similar to that of a cartridge may be inserted into the cover and secured by its walls.

Finally, as shown in FIG. 14, the protruding rims 81 as described in FIG. 12 may be replaced by a disk tray 84. An opening 85, substantially the same size and shape as a cartridge, is positioned in the center of the disk tray 84, thereby allowing a cartridge to be secured within it.

The prior art containers, as previously described, perform adequately in providing an enclosure for securing a hexahedron object such as a mini-disk cartridge, in their base tray and another hexahedron object, usually promotional material, in their cover. However, these containers are limited to using covers with special features for securing promotional material since they are not equipped to handle both in their base trays. Moreover, unless a mechanism is utilized to limit the motion of the cover to less than 180 degrees, the materials in the cover are prone to fall out when the cover is in the open position. Therefore, a need exists for a container in which the base tray may securely house two hexahedron objects, such as a mini-disk cartridge and promotional material or even two mini-disk cartridges. This would enable the container to utilize a cover without any special securing or motion limiting features. Further, a need exists for this container to be cosmetically pleasing to the eye of the consumer, to efficiently utilize the space within the container, and to be easily used by the consumer.

SUMMARY OF THE INVENTION

It has previously been established that a need exists for a container in which two six-sided objects known as a hexahedrons may both be secured within the base tray, and at the same time provide a cosmetically pleasing, simple to utilize, and efficient container. These and other objectives are achieved by the container of the present invention by utilizing a ledge extending inwardly from the base tray of both side walls such that a hexadron object may be secured on top of the ledges, while another hexadron object is stored below the ledges. These objects may take the form of a mini-disk cartridge, promotional material, or the like.

In a preferred embodiment, the container is designed to accommodate mini-disk cartridges and promotional material. The container includes a base tray and a cover, which are preferably hingedly connected at their rears and are preferably made of transparent plastic.

The base tray of this embodiment has two parallel side walls and a rear wall, which extend upwardly from the bottom surface of the base tray and meet at corners. A ledge, which extends inwardly from, preferably, each side wall is utilized as a means for suspending the cartridge or the promotional material above the bottom surface. Each ledge may take the form of a continuous segment along the side wall, where the length of the ledge is preferably greater than half the length of the side wall. On the other hand, each ledge may also be constructed of at least two individually spaced apart protruding tabs.

Depending on the use of the container, the ledges may be vertically positioned along their corresponding side wall to allow the cartridge or promotional material to rest comfortably and securely within the container. Both ledges should be positioned on the side wall the same distance above the base tray's bottom surface so that they are aligned to provide a horizontal resting place for the hexahedron object. A mini-disk cartridge or promotional material may be secured on top of the ledges by allowing the side edges of either to rest upon the top of each ledge. Moreover, by simply vertically positioning the ledges a particular height along the side walls, a cartridge or promotional material, such as a booklet or card, may be securely inserted under the ledges.

If the mini-disk cartridge is placed on top of the ledges with its label side face up and the promotional material is inserted below the ledges with its graphics side face down, then the user may readily identify the contents of the container from both the top and bottom views. Similar results hold true when the promotional material is placed face up on the top of the ledges and the cartridge is inserted below the ledges with its label side face down. Further, two mini-disk cartridges may be enclosed in this container as previously described by placing the first cartridge on top of the ledges with its label side face up and inserting the second cartridge below the ledges with its label side face down. With this method, the labels of both cartridges may be viewed through the top and bottom views of the container respectively. The contents of the container may be further identified via an index or a tab inserted along the interior of the base tray's rear wall.

One or both of the ledges may include a stopper at their front portion, which may be employed to ensure the mini-disk cartridge or promotional material resting on top of the ledges does not slide out of the front end when the container is in the open position. The stopper may take the form of an extension protruding upwardly from the front portion of a ledge and protruding inwardly from the front portion of a side wall. However, the stopper will perform adequately for most uses even if it extends only from the ledge or the side wall.

The cover may include almost any feature, as long as the cover fits with the base tray to create a complete and secure enclosure for its contents. In a preferred embodiment, the cover has two side walls and a front wall, which extend downwardly from the top surface of the cover and meet at corners. These walls typically define the height of the container. Preferably, at least one protruding cover support is formed in the front crease, where the front wall and the top surface come together. At least one protruding cover support is also preferably formed in each side crease, where each side wall and top surface come together. These cover supports should be positioned such that, when the cover is enclosing the container, they may rest upon the side edges of the mini-disk cartridge or promotional material resting on top of the ledges. Along with providing additional support for the cover when the container is in the closed position, these supports may also be utilized to help secure the hexahedron object upon whose side edges the supports are resting.

The exterior of the front wall may also be slightly recessed. This feature allows a user of the container to use this recessed area as a finger grip when opening the cover.

BRIEF DESCRIPTION OF THE DRAWINGS

The accompanying drawings illustrate a preferred but nevertheless illustrative embodiment of the invention, and serve to aid in the explanation of the principles of the invention.

FIG. 1 is an exploded perspective view of the container, having each ledge as a continuous segment, in the open position with the mini-disk cartridge and promotional material ready for insertion.

FIG. 2 is an isolated perspective view of the front portion of a ledge with a stopper.

FIG. 3 is a longitudinal cross-sectional view of the container in the open position with the mini-disk cartridge being inserted at an angle of approximately fifteen degrees and the promotional material already inserted.

FIG. 4 is a longitudinal cross-sectional view of the container in the open position with the mini-disk cartridge and promotional material inserted.

FIG. 5 is a longitudinal cross-sectional view of the container in the closed position with the mini-disk cartridge and promotional material inserted and with the side cover supports resting on the side edges of the mini-disk cartridge.

FIG. 6 is a top cut away perspective view of the container in the closed position with the label of the mini-disk cartridge viewed through the top surface of the cover.

FIG. 7 is a bottom perspective view of the container in the closed position with the graphics side of the promotional material viewed through the bottom surface of the base tray.

FIG. 8 is a longitudinal cross-sectional view of the container having shortened side walls in the open position with the mini-disk cartridge being inserted horizontally.

FIG. 9 is a longitudinal cross-sectional view of the container having shortened side walls and the cover having no cover supports in the closed position.

FIG. 12 is an exploded perspective view of a prior art mini-disk cartridge container, having rimmed protrusions in its base tray, in the open position.

FIG. 13 is an exploded perspective view of a prior art mini-disk cartridge container, with base tray and cover dimensions slightly bigger than that of the mini-disk cartridge, in the open position.

FIG. 14 is an exploded perspective view of a prior art mini-disk cartridge container, with a disk tray, in the open position.

DETAILED DESCRIPTION OF ILLUSTRATIVE EMBODIMENTS

Figure 10:
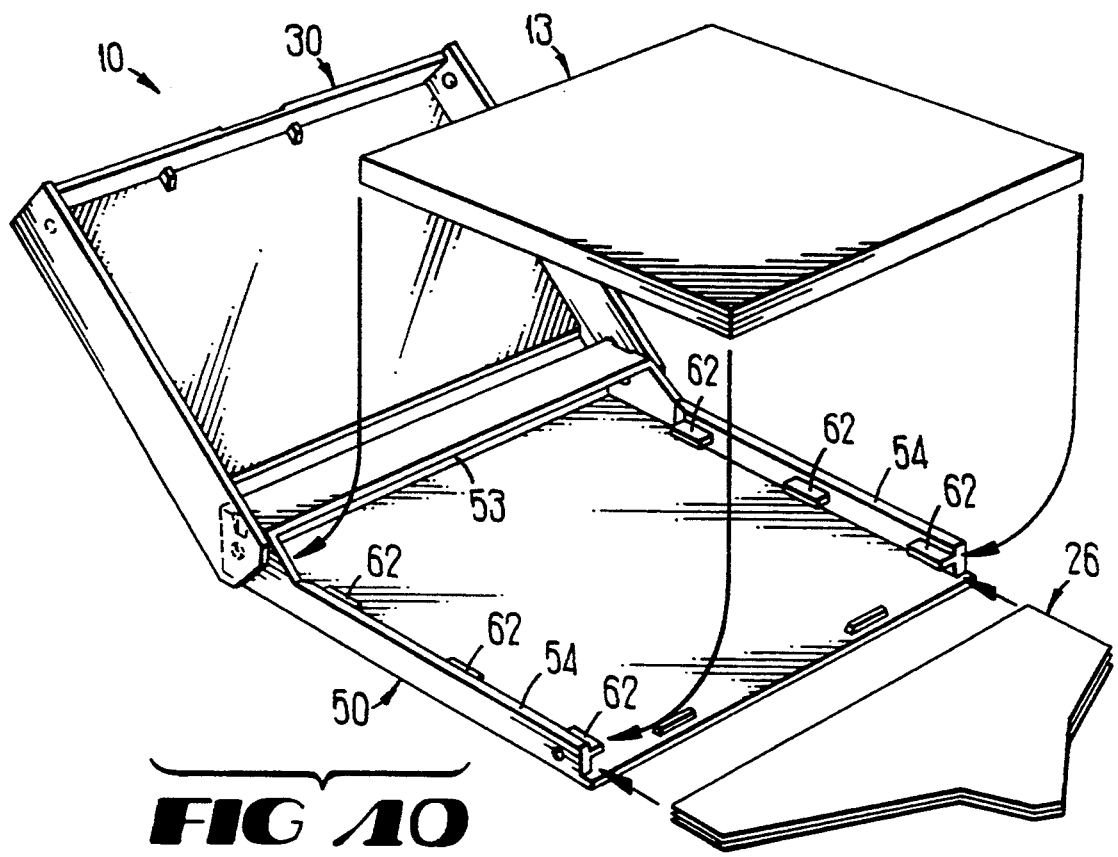
FIG. 10 is an exploded perspective view of the container in the open position with each ledge being formed of three spaced apart tabbed protrusions.

Though the container may be adapted to enclose many different types of hexadron (six sided) objects, in a preferred embodiment of the invention, as shown in FIGS. 1 through 9, the storage container 10 is fashioned to house a mini-disk cartridge 13 (an optical disc which is encased in a rectangular enclosure) and promotional material 26. The container 10 is preferably formed of a transparent plastic material, such as polystyrene, and includes two components, a base tray 50 and a cover 30.

Referring to FIG. 1, the width W (front and rear edges) of the container 10 is preferably longer than the length L (side edges) of the container 10. The length is designed to be slightly longer than the length of a mini-disk cartridge 13, while the width and height H have dimensions that allow the container 10 to be utilized in already existing retail racks for standard audio tape cassette containers. In other embodiments, the width, the height, and the length of the container 10 may have varying dimensions. In one such embodiment, the dimensions for the container 10 may also be adapted for use in existing retail racks for standard size compact disk containers.

The base tray 50 includes two side walls 54 and a rear wall 53, which extend perpendicularly upward from a bottom surface 52 of the base tray 50 and meet at corners. A rear ledge 56 is formed to the top edge of the rear wall 53 and the top edges of the rearward end 59 of the side walls 54. Each side wall 54 preferably has a tapered edge 58, which begins to taper approximately at the most frontward edge of the rear ledge 56. The tapered edge 58 extend downward at an angle, preferably 45 degrees, to approximately the midpoint of the side wall 54. From the lowest tapering point, each side wall 54 extends to the front end 51 of the base tray 50 with a height preferably approximately half the height of the rearward end 59 of each sidewall 54.

Each side wall 54, preferably, has a ledge 55, which protrudes inwardly and includes a planar surface which extends parallel to the bottom surface 52. Each ledge 55, preferably, extends from the front end 51 of the base tray 50 to the beginning of the tapered wall 58 of each side wall 54. The vertical position of each ledge 55 relative to the height of the side wall is such that a mini-disk cartridge or promotional material 26, such as a booklet or card, may be inserted under the ledge 55 and on top of the bottom surface 52. Each ledge 55 is also vertically positioned relative to the height of the side wall 54 such that a mini-disk cartridge 13 or promotional material 26 may rest in a horizontally level position on top of both ledges 55 simultaneously so that it may be suspended above the bottom surface 52 of the base tray 50 and still slide under the rear ledge 56.

As shown in FIG. 1, each ledge 55 may be a continuous segment having a preferable length greater than half the length of the side wall 54 corresponding to the ledge 55. On the other hand, as shown in FIG. 10, the ledge 55 may be formed of two or more systematically spaced apart tabbed protrusions 62, though three tabs are preferred. The length of the ledge 55 on each side wall 54 may vary for different situations. For example, at least one ledge 55 may extend to the rear wall 53 or may extend from the tapered edge 58 to the center of the side wall 54. Also, though not shown, a separate ledge 55 may be formed to the rear wall 53 such that the ledge 55 extends forward.

Figure 11:
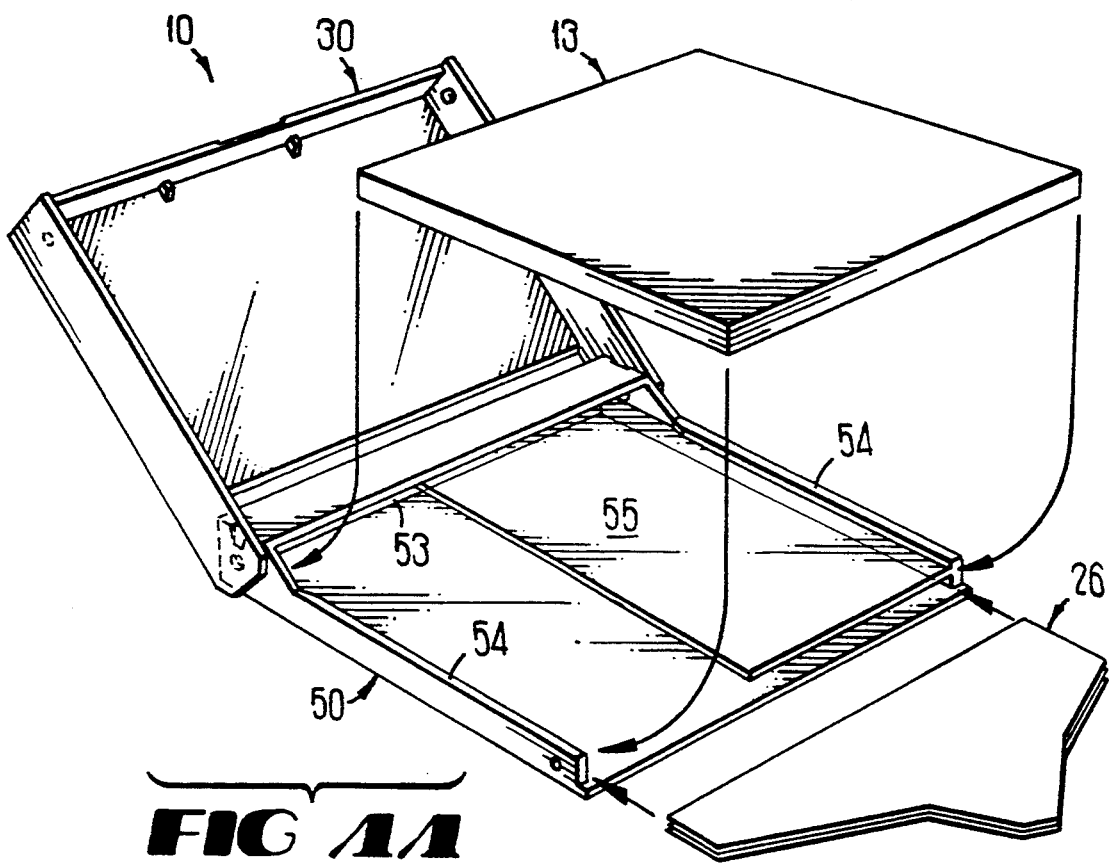
FIG. 11 is an exploded perspective view of the container, having a single ledge, in the open position.

Also, as shown in FIG. 11, a container 10 with a single ledge 55 may utilized, as long as the single ledge 55 extends sufficiently within the base tray 50 to allow the object to rest comfortably and securely upon it. If the single ledge 55 extends slightly more than half the width W of the base tray 50, it should more than adequately serve its purpose for most containers 10. As would be expected, a similar single ledge 55 could extend all the way across to the other side wall 54 or could extend forward from the rear wall 53.

As shown in FIG. 2, each side ledge 55 may have a rectangular stopper 57 formed at the front portion of the ledge 55, which is the portion closest to the base tray's front end 51. For increased strength, the stopper 57 preferably extends inwardly from the side wall 54 and upwardly from the ledge 55, though it may extend only inwardly from the side wall 54 or only upwardly from the ledge 55 depending on the needs of the container 10. The stopper 57 may also take the form of other shapes that may be suited to prevent an object 13 or 26 from sliding out the front end 51 of the base tray 50.

As shown in FIG. 1, the bottom surface 52 of the base tray 50 may have at least one, but preferably two, small protrusions 61 which extend upwardly from the front end 51 such that an interference is created with the object after it is inserted into the base tray 50 below the ledges 55 to prevent it from sliding out of the base tray 50. Preferably, at least one side wall 54 has a capture dimple 68, though it may have a capture protrusion 48. Also, the rearward end 59 of each side wall 54, preferably, has a hinge portion 60, which may take the form of a depression or hole or a protrusion extending outwardly.

In a preferred embodiment for a mini-disk cartridge 13, the cover 30 includes two side walls 34 and a front wall 35, which extend perpendicularly downward from a top surface 32 of the cover 30 and meet at corners. The rearward end 31 of the top surface of the cover 30 is recessed approximately the width of the rear ledge 56 of the base tray 50. Preferably, at least one side wall 34 has a capture protrusion 48 extending inwardly, which corresponds to a matching capture dimple 68 on a side wall 54 of the base tray 50. A capture dimple 68 may be utilized when the base tray employs a capture protrusion 48. The rearward end 33 of each cover side wall 34, preferably, has a hinge portion 40, which may take the form of a protrusion extending inwardly or a depression depending on what is needed to adapt to the corresponding hinge portion 60 of the base tray 50.

At least one protruding front cover support 37 is preferably molded in the crease 41 formed where the front wall 35 and the top inside surface 32 come together. Also, at least one protruding side cover support 38 is preferably molded in the creases 42 formed where each side wall 34 meets the top inside surface 32. These cover supports 37 and 38 are preferably formed in the central portions of the creases 41 and 42. The cover supports 37 and 38 may also be formed extending inwardly from at least one side wall 34 or the front wall 35, or extending downwardly from the top surface 32 of the cover 30. The exterior of the front wall 35 may also have a slightly recessed area 36, preferably in the center portion, which may be used as a finger grip when opening the container 10.

The base tray 50 and the cover 30 are typically attached by mating the hinge portion 60 of the base tray 50 with the hinge portion 40 of the cover 30. However, the base tray 50 may be enclosed with the cover 30 by other methods, such as snapping it on or sliding it on. The front wall 35 of the cover 30 is preferably slightly recessed so that the front end 51 of the base try 50 extends beyond it. This configuration allows one to more easily pry open the cover 30 while making use of the cover's finger grip 36. When the hinge is used, the cover 30 rotates about an axis centered through the rearward end 59 of each side wall 54 of the base tray 50 and parallel with the length of the rear wall 53. In the closed position, a capture protrusion 48 in the cover and capture dimple 68 in the base tray or vice-versa, as previously described, may be mated to keep the container 10 securely in the closed position.

As shown in FIGS. 3 through 5, a mini-disk cartridge 13 may be inserted on top of the ledges 55 and promotional material 26 may be secured under the ledges 55 such that it rests on the bottom surface 52 of the base tray 50. The promotional material 26 is preferably inserted with its graphics side facing downward such that the contents of the container 10 may be readily accessible for viewing.

Referring to FIG. 3, in a preferred embodiment, the mini-disk 13 may be inserted into the container 10 horizontally or up to approximately a fifteen degree angle such that a portion of the mini-disk 13 may be positioned under the rear ledge 56 of the base tray 50. Referring to FIG. 4, when the mini-disk cartridge 13 is fully inserted, it should rest on top of the ledges 55. Finally, as shown in FIG. 5, the cover 30 is utilized to enclose the container 10 and the side supports 38 and front supports 37 of the cover 30 should rest on the outer edge of the mini-disk 13 to support the cover 30 and to secure the cartridge 13 within the container 10. The recessed rearward end 31 of the cover 30 should come in close proximity with the rear ledge 56 of the base tray 50 such that they work in tandem to protect the rear portion of the mini-disk cartridge 13.

As shown in FIGS. 6 and 7, when the container 10 is in the closed position, by inserting the mini-disk 13 with its label side facing upward, the user may readily identify the contents of the container 10. Referring to FIG.

6, the label on the mini-disk 13 may be viewed through the transparent top surface 32 of the cover 30. Also, graphics from the promotional booklet 26 or the like may be viewed through the transparent bottom surface 52 of the base tray 50, as shown in FIG. 7. Though not shown, an index or tab may also be inserted along the interior of the rear wall 53 of the base tray 50 such that the contents of the container 10 may be identified from the rear side view.

In a second preferred embodiment, as shown in FIGS. 8 and 9, the height of the cover 30 and the base tray 50 may be reduced. In doing so, the cover supports 37 and 38 may be removed or shortened, and the rear wall 53 of the base tray 50 may be shortened. Referring to FIG. 8, with the container 10 in the open position a promotional booklet 26 or the like may be inserted under the ledges 55. Also, the mini-disk cartridge 13 may be inserted into the container 10 such that a portion of the cartridge 13 is positioned under the base tray's rear ledge 56. Since the height of the rear wall of the base tray 50 is decreased, the cartridge 13 should be inserted approximately horizontally (at an angle much less than thirty degrees) due to the decreased clearance under the rear ledge 56. As shown in FIG. 9, when the cover 30 encloses the container 10, the top inside surface 32 of the cover 30 is in close proximity with the mini-disk cartridge 13.

What has been described above are preferred embodiments of the present invention. It is of course not possible to describe every conceivable combination of components for purposes of describing the present invention, but one of ordinary skill in the art will recognize that many further combinations and permutations of the present invention are possible. All such possible modifications are to be included within the scope of the claimed invention, as defined by the claims below.

I claim:

1. For use in an enclosure for a hexahedron shaped object, a base tray for receiving the hexahedron shaped object comprising:
    a bottom surface,
    a pair of opposed side walls integrally formed with said bottom surface and extending upwardly from said bottom surface,
    a rear wall extending upwardly from said bottom surface, and
    at least one ledge extending inwardly from at least one of said side walls for securing the hexahedron shaped object and promotional material within said base tray, said at least one ledge including,
        a planar upper ledge surface which extends parallel to said bottom surface, and
        a planar lower ledge surface disposed opposite said bottom surface, which extends parallel to said bottom surface, wherein one of said ledge surfaces engages the hexahedron shaped object.

2. The base tray of claim 1, wherein each of said side walls includes a said at least one ledge, and wherein said at least one ledge extending inwardly from each of said side walls is positioned an equal distance above said bottom surface.

3. The base tray of claim 1, wherein said at least one ledge has a continuous length greater than half the length of said side walls.

4. The base tray of claim 1, wherein said at least one ledge includes at least two spaced apart tabbed protrusions.

5. The base tray of claim 1, further including a front end located at an end opposite said rear wall, wherein said at least one ledge includes a front portion located at said front end, and wherein said front portion of said at least one ledge includes a stopper extension protruding upwardly.

6. The base tray of claim 1, including a front end located at an end opposite said rear wall, wherein said side walls of said base tray include a front portion located at said front end, and wherein said front portion of at least one of said side walls includes a stopper extension protruding inwardly.

7. The base tray of claim 1, wherein said bottom surface includes a front end located at an end opposite said rear wall, and wherein at least one protrusion extends upwardly from said front end of said bottom surface.

8. The enclosure of claim 7, wherein said protrusion is rectangular.

9. The enclosure of claim 1, wherein said base tray is formed of plastic.

10. An enclosure for a hexahedron shaped object comprising:
    a base tray adapted to receive the object including:
        a bottom surface,
        a pair of opposed side walls integrally formed with said bottom surface add extending upwardly from said bottom surface,
        a rear wall extending upwardly from said bottom surface, and
        at least one ledge extending inwardly from at least one of said side walls for securing the hexahedron shaped object within said container, wherein said at least one ledge includes,
            a planar upper ledge surface which extends parallel to said bottom surface, and
            a planar lower ledge surface disposed opposite said bottom surface which extends parallel to said bottom surface wherein at one of said ledge surfaces engages the hexahedron shaped object; and
    a cover hingedly connected to said base tray including:
        a top surface,
        a pair of opposed side walls extending downwardly from said top surface, and
        a front wall extending downwardly from said top surface.

11. The enclosure of claim 10, wherein each of said side walls includes a said at least one ledge, and wherein said at least one ledge extending inwardly from each of said side walls is positioned an equal distance above said bottom surface.

12. The enclosure of claim 10, wherein said at least one ledge has a continuous length greater than half the length of said side walls.

13. The enclosure of claim 10, wherein said at least one ledge includes at least two spaced apart tabbed protrusions.

14. The enclosure of claim 10, wherein said base tray further includes a front end located at an end opposite said rear wall, wherein said at least one ledge includes a front portion located at said front end, and wherein said front portion of said at least one ledge includes a stopper extension protruding upwardly.

15. The enclosure of claim 10, wherein said base tray further includes a front end located at an end opposite said rear wall, wherein said side walls of said base tray include a front portion located at said front end, and wherein said front portion of at least one of said side walls includes a stopper extension protruding inwardly.

16. The enclosure of claim 10, wherein said bottom surface includes a front end located at an end opposite said rear wall, and wherein at least one protrusion extends upwardly from said front end of said bottom surface.

17. The enclosure of claim 16, wherein said at least one protrusion is rectangular.

18. The enclosure of claim 10, wherein said base tray is formed of plastic.

19. The enclosure of claim 10, wherein said cover includes a support extension protruding inwardly from at least one of said side walls of said cover.

20. The enclosure of claim 10, wherein said cover includes a support extension protruding inwardly from said front wall of said cover.

21. The enclosure of claim 10, wherein said cover includes a support extension protruding downwardly from said top surface of said cover.

22. The enclosure of claim 21, wherein said support extension is positioned in close proximity to said front wall of said cover.

23. The enclosure of claim 21, wherein said support extension is positioned in close proximity to one of said side walls of said cover.

24. The enclosure of claim 10, wherein said cover includes a plurality of support extensions protruding inwardly from at least one of said side walls of said cover.

25. The enclosure of claim 10, wherein said cover includes a plurality of support extensions protruding inwardly from said front wall of said cover.

26. The enclosure of claim 10, wherein said cover includes at least one support extension protruding inwardly from said front wall and at least one of said side walls of said cover.

27. The enclosure of claim 26, wherein said at least one support extension protrudes inwardly from each of said side walls of said cover.

28. The enclosure of claim 10, wherein said cover includes a plurality of support extensions protruding downwardly from said top surface of said cover.

29. The enclosure of claim 28, wherein at least one of said plurality of support extensions is positioned in close proximity to said front wall of said cover, and wherein at least one of said plurality of support extensions is positioned in close proximity to at least one of said side walls of said cover.

30. The enclosure of claim 29, wherein said at least one support extension is positioned in closed proximity to each of said side walls of said cover.

31. The enclosure of claim 10, wherein a recessed area is formed on an outside portion of said front wall of said cover.

* * * * *